US006990573B2

(12) United States Patent
Cherian et al.

(10) Patent No.: US 6,990,573 B2
(45) Date of Patent: Jan. 24, 2006

(54) SYSTEM AND METHOD FOR SHARING STORAGE TO BOOT MULTIPLE SERVERS

(75) Inventors: Jacob Cherian, Austin, TX (US); William P. Dawkins, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 511 days.

(21) Appl. No.: 10/358,620

(22) Filed: Feb. 5, 2003

(65) Prior Publication Data

US 2004/0153639 A1  Aug. 5, 2004

(51) Int. Cl.
*G06F 15/177* (2006.01)
*G06F 9/24* (2006.01)

(52) U.S. Cl. ............................ 713/1; 713/2; 709/222
(58) Field of Classification Search ............... 713/1
See application file for complete search history.

(56) References Cited

U.S. PATENT DOCUMENTS

| 5,349,643 A | 9/1994 | Cox et al. .................. 380/25 |
| 5,574,915 A | 11/1996 | Lemon et al. ............... 395/700 |
| 5,848,367 A | 12/1998 | Lotocky et al. .............. 701/36 |
| 6,317,879 B1 | 11/2001 | Jacobson, Jr. et al. ........ 717/11 |
| 6,421,777 B1 | 7/2002 | Pierre-Louis et al. .......... 713/2 |
| 6,460,136 B1 | 10/2002 | Krohmer et al. .............. 713/2 |
| 6,532,538 B1 * | 3/2003 | Cronk et al. ................... 713/2 |
| 6,877,011 B2 * | 4/2005 | Jaskiewicz ................. 707/102 |
| 2003/0126242 A1 * | 7/2003 | Chang ....................... 709/222 |

OTHER PUBLICATIONS

Patrick Waddell's "*Venturcom BXP 2.0 for Windows 2000 and Windows XP—Centralized Management of Network Attached Diskless Clients*" Venturcom White Paper. pp. 1-7.

* cited by examiner

*Primary Examiner*—Thuan Du
*Assistant Examiner*—Stefan Stoynov
(74) *Attorney, Agent, or Firm*—Baker Botts L.L.P.

(57) ABSTRACT

An information handling system includes first and second servers in communication with shared storage. The shared storage may include a shared operating-system storage subdivision containing unmodified operating system data, as well as first and second delta storage subdivisions containing operating-system data configured for the first and second servers, respectively. The information handling system may also include one or more delta drivers that use the shared operating-system storage subdivision and the first and second delta storage subdivisions to provide first and second virtual storage subdivisions for booting first and second instances of an operating system, where each instance may be configured differently for each server. For example, for operations from the first server involving modified and unmodified portions of the first virtual storage subdivision, the delta driver may automatically access the first delta storage subdivision and the shared operating-system storage subdivision, respectively.

20 Claims, 2 Drawing Sheets

SYSTEM AND METHOD FOR SHARING STORAGE TO BOOT MULTIPLE SERVERS

TECHNICAL FIELD

The present invention relates in general to information handling systems and, in particular, to systems and methods for sharing storage to boot multiple information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a modular computing system. A modular computing system may include a number of interconnected servers, with one or more central processing units (CPUs) in each server. For instance, the servers may be implemented as blade or brick servers residing in one or more server racks. A server may also be considered an information handling system.

One trend in the information technology industry is the move to modular computing systems with higher processor density. One issue faced by that trend is the limited space available in the system for local storage for the operating system and configuration information. Although it is frequently desirable to use different operating system configurations on different servers within a modular computing system, conventional systems require distinct local storage devices (e.g., hard disk drives) for booting servers with different operating system configurations. When the configuration settings on the servers are different, a separate system image for each server must be maintained, so that a restore can be done in case of failure. In addition, the increased need for local storage reduces the space available for processors and increases the time required to effect recovery when a system fails, by reinstalling a complete operating system and other software components.

One approach to addressing the inefficiencies associated with using a separate local storage device for each server in the modular computing system is for each server to use a shared device to boot. For instance, network boot products are available that allow each server to use the INTEL pre-execution environment (PXE) to boot from a single operating-system image on a network server. Consequently, each server boots to an identical image or instance of the operating system. Although this approach can reduce the amount of local storage required, this approach reduces the flexibility of the modular computing system. In addition, any per server configuration changes that may subsequently be made to an individual server will be lost when that server is rebooted.

SUMMARY

In accordance with teachings of the present disclosure, a system and method are described for sharing storage to boot multiple information handling systems. In one example embodiment, an information handling system includes first and second servers in communication with shared storage. The shared storage may include a shared operating-system storage subdivision containing unmodified operating system data, as well as first and second delta storage subdivisions containing operating-system data configured for the first and second servers, respectively. The information handling system may also include one or more delta drivers that use the shared operating-system storage subdivision and the first and second delta storage subdivisions to provide first and second virtual storage subdivisions for booting first and second instances of an operating system, where each instance may be configured differently for each server. For example, for operations from the first server involving modified and unmodified portions of the first virtual storage subdivision, the delta driver may automatically access the first delta storage subdivision and the shared operating-system storage subdivision, respectively. Alternative embodiments relate to an individual information handling system such as a server that uses a delta driver to boot from shared storage. Other alternative embodiments concern software or hardware implementing the delta driver, as well as a method for using a delta driver to boot from shared storage.

BRIEF DESCRIPTION OF THE DRAWINGS

A more complete understanding of the present embodiments and advantages thereof may be acquired by referring to the following description taken in conjunction with the accompanying drawings, in which.

DETAILED DESCRIPTION

Preferred embodiments and their advantages are best understood by reference to FIGS. 1 through 4, in which like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components. A modular computing system with multiple interconnected servers in one or more server racks may also be considered an information handling system.

Figure 1:
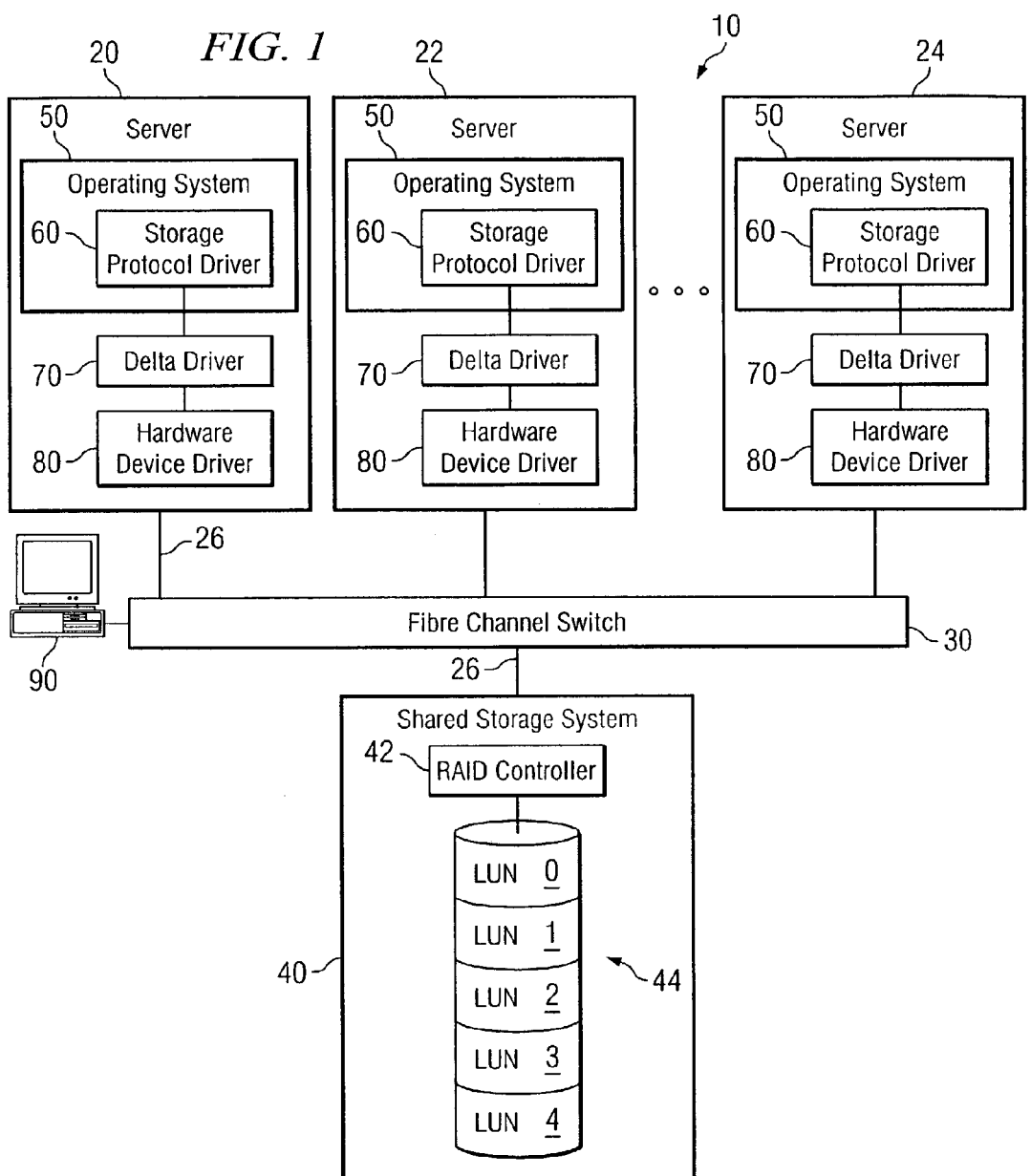
FIG. 1 depicts an information handling system with facilities for booting different instances of an operating system from shared storage according to an example embodiment of the present invention.

FIG. 1 depicts an information handling system 10 with facilities for booting different instances of an operating system from shared storage according to an example embodiment of the present invention. In FIG. 1, information handling system 10 is depicted as a modular computing system 10 containing multiple servers 20, 22, 24 connected to a shared storage system 40 via one or more fibre channel communication channels 26 and fibre channel switches 30. Each server may include the same components or different hardware and software components, and the servers 20, 22, 24 may be interconnected via one or more server racks, for instance. Alternative embodiments may include different numbers of servers, storage systems, switches, and other components, and the servers may be connected to shared storage using any appropriate technology, including technologies supporting block storage protocols such as small computer systems interface (SCSI), Internet SCSI (iSCSI), serial ATA, INTEL pre-execution environment (PXE), etc., or any other protocol that allows booting over a network.

Shared storage system 40 may include one or more storage controllers, such as redundant array of independent drives (RAID) controller 42. RAID controller 42 may provide access to multiple physical storage devices, such as hard disk drives 44, and RAID controller 42 may partition those drives into multiple physical or logical storage subdivisions, such as logical unit numbers (LUNs) 0 through 4. In alternative embodiments, different types of storage subdivisions may be used, including without limitation partitions of LUNs and any division of the shared storage allowed by the delta driver.

An administrative workstation 90 may be used to configure, monitor, and maintain modular computing system 10.

As described in greater detail below, modular computing system 10 may include one or more delta drivers 70 that facilitate booting servers 20, 22, 24 from shared storage, such as shared storage system 40. In the example embodiment of FIG. 1, delta drivers 70 are implemented as computer instructions or software that reside or operate logically between the low level hardware device drivers 80 and the operating systems 50 in each server 20, 22, 24.

However, in alternative embodiments, one or more delta drivers may be implemented as hardware or as a combination of hardware and software in the server machines, between the servers and the shared storage devices, or within the shared storage devices. For instance, a modular computing system may include a single, relatively independent delta driver mounted in a server rack with multiple servers and operating as a common delta driver for those servers.

Figure 2:
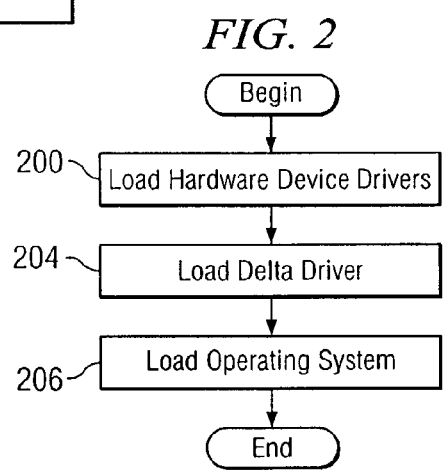
FIG. 2 depicts a flowchart of a process for booting an operating system from shared storage according to an example embodiment of the present invention.

FIG. 2 depicts a flowchart of an example embodiment of a process for booting an operating system in server 20 from shared storage 40. The illustrated process begins with initiation of a basic input/output system (BIOS) boot process for server 20. At block 200, the BIOS boot code loads one or more hardware device drivers into random access memory (RAM) in server 20, such as a hardware device driver 80 for a host bus adapter (HBA) in server 20 for communicating with shared storage 40. After hardware device driver 80 is loaded but before the operating system is loaded, delta driver 70 is loaded into RAM in server 20, as shown at block 202. The hardware device drivers and delta driver 70 may be loaded, for instance, from non-volatile memory or ROM.

For software implementations of delta driver 70, no specialized hardware and no specialized operating system would typically be needed. Delta driver 70 may be loaded during an otherwise conventional boot-strap process, before any operating system image is loaded. Then, once delta driver 70 has been loaded, it may be used to load a conventional operating system. For instance, in the example process illustrated in FIG. 2, after delta driver 70 has been loaded, server 20 then uses delta driver 70 to load an operating system into RAM from shared storage 40, as depicted at block 206.

Figure 3:
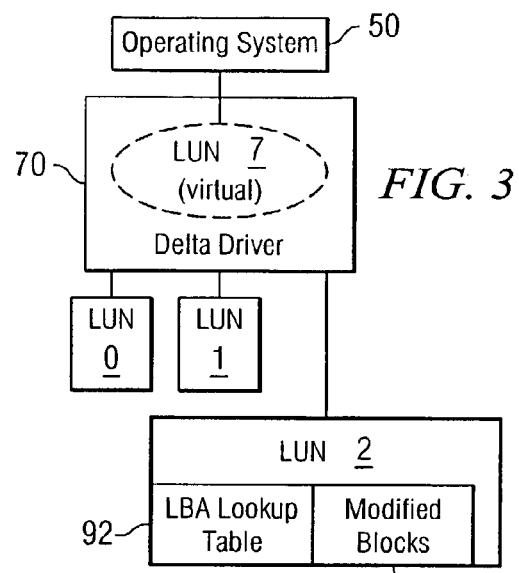
FIG. 3 depicts a logical block diagram of a virtual storage subdivision and associated physical storage subdivisions according to an example embodiment of the present invention.

In particular, in the example embodiment shown in FIG. 3, delta driver 70 provides a virtual storage subdivision (e.g., a virtual operating-system LUN) for booting the operating system into server 20, based on (a) a shared operating-system storage subdivision in shared storage 40 containing substantially unmodified operating-system data and (b) a delta storage subdivision in shared storage 40 containing modified operating-system data configured for server 20. Delta drivers in servers 22, 24 may provide similar virtual operating-system LUNs, using different delta storage subdivisions to provide different operating system configurations for each server.

For example, the substantially unmodified operating-system data may contain operating-system code for a basic operating-system configuration, to form an operating-system baseline for servers 20, 22, 24. The modified operating-system data may contain additional operating system configuration information, additional application server code, configuration information for the application servers, user configuration information, etc.

FIG. 3 depicts a logical block diagram of an example embodiment of a virtual storage subdivision 7 and associated physical storage subdivisions 0, 1, and 2 according to the process of FIG. 2. As illustrated, delta driver 70 provides a virtual storage subdivision, such as virtual LUN 7, for booting operating system 50 into server 20 and for processing subsequent storage I/O commands from operating system 50. Thus server 20 may simply read and write to virtual LUN 7 using standard I/O commands such as SCSI commands, as if virtual LUN 7 were a physical LUN. However, as described in greater detail below, delta driver 70 may redirect reads and writes as necessary to support booting servers 20, 22, 24 to different instances of the operating system, with each instance possibly configured differently. Virtual storage subdivision 7 may also be referred to as a virtual operating-system storage subdivision 7 or a virtual boot storage subdivision 7.

As shown in FIG. 3, the physical storage subdivisions in modular computing system 10 include a single, shared operating-system LUN 0 that contains the operating system code and software that is common to all servers 20, 22, 24. LUN 0 may be designated as read-only, for example through use of the PERSISTENT RESERVATION SCSI command.

In the example embodiment, the physical storage subdivisions also include a configuration LUN 1 that contains delta driver configuration information for modular computing system 10. Servers 20, 22, 24 may access LUN 1 to retrieve information from LUN 1 that indicates which delta LUN (described below) corresponds to a given server. For instance, in the example embodiment, the delta driver configuration data in configuration LUN 1 contains information that associates server 20 with delta LUN 2.

Configuration LUN 1 may also be designated as read only. However, administrative workstation 90 may be given authority to modify operating system LUN 0 and configuration LUN 1, if necessary. In alternative embodiments, configuration data may be stored in the shared operating system storage subdivision, instead of using a separate configuration storage subdivision. Nevertheless, the delta driver configuration data may be kept persistent, to preserve that data in case of upgrades to the operating system.

In the example embodiment, shared storage 40 also includes a distinct delta storage subdivision for each server in modular computing system 10. For instance, in the example embodiment, delta LUN 2 in FIG. 3 is the delta storage subdivision for server 20. Consequently, as described in greater detail below, delta LUN 2 may include modified blocks 94 of data from operating-system LUN 0, such as operating-system configuration data written to virtual LUN 7 by server 20 and redirected to delta LUN 2 by delta driver 70. Also, additional delta driver configuration data may be stored in the delta storage subdivisions. For example, delta LUN 2 may include data that associates particular virtual addresses in virtual LUN 7 with physical addresses in delta LUN 2 for the modified blocks of data. In the example embodiment, that data is stored as a logical block address (LBA) lookup table 92.

Delta drivers in servers 22, 24 may use a similar model for providing respective virtual operating-system storage subdivisions. However, in the example embodiment, configuration LUN 1 associates a different delta storage subdivision with each server, to allow each server to boot to a unique software configuration. For example, a delta driver in server 22 may use operating-system LUN 0, configuration LUN 1, and delta LUN 3 to provide server 22 with a distinct virtual operating-system LUN. Similarly, delta LUN 4 may be used to provide a different virtual operating-system LUN for server 24. Thus, delta LUNs 2, 3, 4 may contain modified operating-system data configured specifically for servers 20, 22, 24, respectively.

As illustrated in FIG. 1, delta driver 70 may reside logically between the instance 50 of the operating system in server 20 and shared storage system 40. In particular, delta driver 70 may reside logically between protocol device driver 60 in operating-system instance 50 and hardware device driver 80 in server 20. As depicted in FIG. 2, delta driver 70 may be implemented as computer instructions that are loaded during a boot process for servers 20, 22, 24 before the different instances of the operating system for those servers are loaded.

Thus, modular computing system 10 may include multiple servers 20, 22, 24 in communication with at least one shared storage system 40 that contains a shared operating-system storage subdivision 0 storing substantially unmodified operating-system data. Shared storage 40 may also include multiple delta storage subdivisions, such as LUNs 2, 3, 4, with each delta storage subdivision containing modified operating-system data configured for a respective one of the servers. In addition, one or more delta drivers in modular computing system 10 may use shared operating-system storage subdivision 0 and the delta storage subdivisions 2, 3, 4 to provide individual virtual storage subdivisions, such as LUN 7, for booting different instances of an operating system into the different servers. For example, the instance of the operating system booted into server 20 may be configured differently from the instance of the operating system booted into server 22.

Modular computing system 10 may also include delta driver configuration data that the delta drivers use to implement the virtual storage subdivisions. For example, the delta driver configuration data may include system configuration information that identifies which delta storage subdivisions relate to which servers. The delta driver configuration data may also include information such as that in LBA lookup table 92, associating storage addresses in delta storage subdivision 2 with virtual storage addresses for virtual storage subdivision 7. The delta driver configuration data may likewise include LBA lookup tables or other data constructs linking addresses in other virtual storage subdivisions with other delta storage subdivisions.

As described in greater detail below with reference to FIG. 4, delta drivers may provide respective virtual storage subdivisions for the different instances of the operating system executing in the different servers by automatically performing redirect-on-write and redirect-on-read operations. For instance, delta driver 70 may automatically access storage addresses in delta storage subdivision 2 in response to operations from server 20 involving the modified operating-system data configured for server 20. And, for operations from server 20 involving substantially unmodified operating-system data, delta driver 70 may automatically access storage addresses in shared operating-system storage subdivision 0.

One aspect of the present invention concerns an individual server or comparable information handling system that is capable of booting a custom-configured instance of an operating system from shared storage in a modular computing system. The shared storage may contain a shared operating-system storage subdivision, a first delta storage subdivision associated with the server, and a second delta storage subsystem associated with a different server. The first delta storage subdivision may contain modified operating-system data configured for the first server, and the second delta storage subdivision may contain modified operating-system data configured for the other server. For instance, each server may contain one or more CPUs in communication with RAM. The first server may also include a delta driver in communication with the shared storage, and the delta driver may use the shared operating-system storage subdivision and the first delta storage subdivision to provide a virtual storage subdivision for the first server. The delta driver may thus support booting the custom-configured instance of the operating system on the first server from the shared storage, while the shared storage may also support booting the other server to a different custom-configured instance of the operating system.

The delta driver may be implemented as computer instructions in the RAM and executable by the one or more CPUs to provide the first virtual storage subdivision for the first server. Alternatively, the delta driver may be implemented partially or completely as hardware, in communication with the one or more CPUs, that provides the virtual storage subdivision for the first server.

The present invention also concerns a method of booting an information handling system to a custom-configured instance of an operating system from shared storage. The method may include steps during a boot process in the information handling system for automatically consulting delta driver configuration data to identify which delta storage subdivision among multiple delta storage subdivisions in shared storage is associated with the information handling system. The delta storage subdivisions may contain modified operating-system data configured for respective information handling systems. According to the method, a delta driver in communication with the shared storage may provide a first virtual storage subdivision for the information handling system, based on a shared operating-system storage subdivision in the shared storage and the delta storage subdivision in the shared storage identified as associated with the information handling system. The shared operating-system storage subdivision may contain substantially unmodified operating-system data. The method may also include booting an instance of the operating-system configured for the information handling system into the information handling system from the virtual storage subdivision.

The method may include steps for loading an I/O hardware driver into RAM of the information handling system during execution of BIOS boot instructions in the information handling system, loading the delta driver into the RAM after the I/O hardware driver has been loaded, and then using the delta driver to boot the instance of the operating-system configured for the information handling system into the information handling system.

A related method according to the present invention concerns booting multiple information handling systems to respective, custom-configured instances of the operating system from shared storage.

Figure 4:
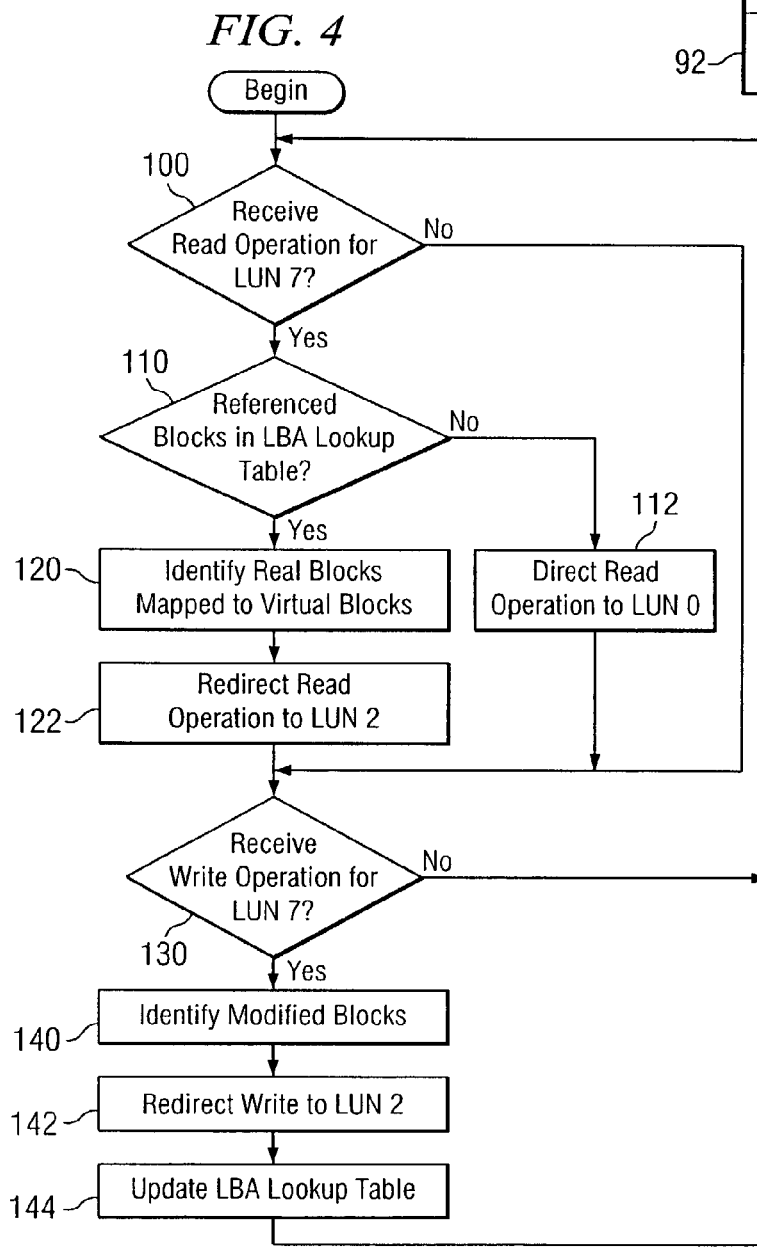
FIG. 4 depicts a flowchart of a process for providing a virtual storage subdivision according to an example embodiment of the present invention.

FIG. 4 depicts a flowchart of one example embodiment of a process for providing a virtual storage subdivision according to the present invention. The illustrated process may be used, for example, to support the operation of loading operating-system instance 50 into server 20 from shared storage 40, as illustrated at block 204 of FIG. 2. The process of FIG. 4 may begin immediately after completion of step 202 in FIG. 2, with delta driver 70 loaded into server 20 and waiting to handle I/O commands.

At block 100 in FIG. 4, delta driver 70 may determine whether it has received a read operation involving one or more addresses in virtual storage subdivision 7 from software such as an operating-system boot loader in server 20. The address or addresses in the I/O commands processed by delta driver 70 may simple be referred to as blocks. As depicted at block 110, if a read command for virtual storage subdivision 7 has been received, delta driver 70 may automatically consult configuration data from LBA lookup table 92 to determine whether the pertinent blocks have been associated with delta storage subdivision 2. If they have, delta driver 70 may identify the blocks in delta storage subdivision 2 that have been mapped to the virtual blocks in the read command and redirect the read command to those blocks, as illustrated at blocks 120 and 122. However, if the blocks in the read command are not associated with delta storage subdivision 2, delta driver 70 may direct the read command to operating-system storage subdivision 0, as depicted at block 112. Delta driver 70 may thus return shared operating-system data from operating-system storage subdivision 0 or data that has been modified by server 20, as appropriate, in response to I/O commands referencing virtual storage subdivision 7.

Delta driver 70 may thus direct the read operation to the appropriate delta storage subdivision if the delta driver configuration data associates the virtual storage address from the read operation with the first delta storage subdivision, and may direct the read operation to the shared operating-system storage subdivision if the delta driver configuration data does not associate the virtual storage address with the first delta storage subdivision.

As depicted at block 130, delta driver 70 may then determine whether it has received a write operation for virtual storage subdivision 7, for example after processing a read operation or determining at block 100 that a read operation has not been received. If no write operation has been received, the process may simply return to block 100 to await the next I/O command. If a write operation for storage subdivision 7 has been received, delta driver 70 may identify the blocks in delta storage subdivision 2 that will receive the data from the write command, as shown at block 140. Delta driver 70 may also redirect the command to delta storage subdivision 2, as depicted at block 142, and update LBA lookup table 92 to associate the modified blocks in delta storage subdivision 2 with the corresponding blocks in virtual storage subdivision 7. Delta driver 70 may thus automatically update the delta driver configuration data with a storage address in delta storage subdivision 2 for the redirected write operation. The process may then return to block 100, with subsequent I/O commands processed in a manner more or less like that described above.

According to the disclosed embodiments, multiple servers may boot to different instances of a conventional operating system, with possibly different operating-system configurations for each server. In the example embodiment, delta driver 70 may use the I/O hardware driver to retrieve data from operating-system storage subdivision 0 and delta storage subdivision 0, as appropriate, and may respond to the received I/O commands with the retrieved data as if that data were physically stored in LUN 7. Moreover, this functionality requires no code or design changes to the operating system itself. A delta driver according to the present disclosure may allow a conventional operating system, with no modifications, to be booted from a virtual storage subdivision and perform subsequent I/O operations, with reads and writes redirected as described in a manner completely hidden from the operating system.

Although various example embodiments have been described in detail, it should be understood that numerous changes and substitutions could be made without departing from the spirit and scope of the present invention. For instance, although one particular example modular computing system has been described in detail, those of ordinary skill in the art will appreciate that alternative embodiments could be deployed with many variations in the number and type of components in the modular computing system, the communication protocols, the system topology, the distribution of various software and data components among the hardware devices in the modular computing system, and myriad other details without departing from the present invention.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, information handling systems incorporating the invention may include personal computers, mini computers, mainframe computers, distributed computing systems, and other suitable devices.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic or optical carriers. The control logic may also be referred to as a program product.

Many other aspects of the example embodiments may also be changed in alternative embodiments without departing from the scope and spirit of the invention. The scope of the invention is therefore not limited to the particulars of the illustrated embodiments or implementations but is defined by the appended claims.

What is claimed is:

1. An information handling system with shared boot storage, the information handling system comprising:
   first and second servers;
   shared storage in communication with the first and second servers;
   a shared operating-system storage subdivision in the shared storage containing substantially unmodified operating-system data;
   first and second delta storage subdivisions in the shared storage, wherein the first delta storage subdivision contains modified operating-system data configured for the first server, and the second delta storage subdivision contains modified operating-system data configured for the second server;
   one or more delta drivers in communication with the shared storage, wherein the one or more delta drivers use the shared operating-system storage subdivision and the first and second delta storage subdivisions to provide first and second virtual storage subdivisions for booting first and second instances of an operating system for the first and second servers, respectively, such that the first instance of the operating system may be configured differently from the second instance of the operating system.

2. The information handling system of claim 1, further comprising:
   delta driver configuration data accessible to the one or more delta drivers, wherein:
   the delta driver configuration data associates storage addresses in the first delta storage subdivision for the modified operating-system data configured for the first server with virtual storage addresses for the first virtual storage subdivision; and
   the delta driver configuration data associates storage addresses in the second delta storage subdivision for the modified operating-system data configured for the second server with virtual storage addresses for the second virtual storage subdivision.

3. The information handling system of claim 1, wherein:
   the delta driver provides the first virtual storage subdivision for the first instance of the operating system executing in the first server, by performing operations comprising:
   automatically accessing storage addresses in the first delta storage subdivision in response to operations from the first server involving the modified operating-system data configured for the first server; and
   automatically accessing storage addresses in the shared operating-system storage subdivision in response to operations from the first server involving the substantially unmodified operating-system data.

4. The information handling system of claim 1, wherein, in response to a write operation from the first server that involves the substantially unmodified operating-system data, the delta driver automatically performs operations comprising:
   redirecting the write operation to the first delta storage subdivision; and
   updating the delta driver configuration data with a storage address in the first delta storage subdivision for the redirected write operation.

5. The information handling system of claim 1, wherein, in response to a read operation from the first server that involves a virtual storage address in the first virtual storage subdivision, the delta driver automatically performs operations comprising:
   determining whether the delta driver configuration data associates the virtual storage address with the first delta storage subdivision;
   directing the read operation to the first delta storage subdivision if the delta driver configuration data associates the virtual storage address with the first delta storage subdivision; and
   directing the read operation to the shared operating-system storage subdivision if the delta driver configuration data does not associate the virtual storage address with the first delta storage subdivision.

6. The information handling system of claim 1, wherein:
   the shared operating-system storage subdivision comprises an operating-system logical unit number (LUN); and
   the virtual storage subdivision comprises a virtual LUN.

7. The information handling system of claim 1, wherein the delta driver configuration data identifies which delta storage subdivisions relate to which servers.

8. The information handling system of claim 1, further comprising a configuration storage subdivision in the shared storage, wherein the configuration storage subdivision contains at least part of the delta driver configuration data.

9. The information handling system of claim 1, further comprising a lookup table in the first delta storage subdivision, wherein the lookup table contains at least part of the delta driver configuration data.

10. The information handling system of claim 1, wherein the delta driver resides logically between the operating system in the first server and the shared storage.

11. The information handling system of claim 1, wherein the delta driver resides logically between a protocol device driver in the operating system of the first server and a hardware device driver in the first server.

12. The information handling system of claim 1, wherein the delta driver comprises computer instructions loaded during a boot process for the first server before the operating system is loaded.

13. An information handling system capable of booting a custom-configured instance of an operating system from shared storage, wherein the shared storage contains a shared operating-system storage subdivision, a first delta storage subdivision associated with the information handling system, and a second delta storage subsystem associated with a different information handling system, and wherein the first delta storage subdivision contains modified operating-system data configured for the information handling system, and the second delta storage subdivision contains modified operating-system data configured for the different information handling system, the information handling system comprising:

one or more central processing units (CPUs);

random access memory (RAM) in communication with the one or more CPUs; and a delta driver in communication with the shared storage, wherein the delta driver uses the shared operating-system storage subdivision and the first delta storage subdivision to provide a virtual storage subdivision for a first server, such that the delta driver supports booting the custom-configured instance of the operating system on the first server from the shared storage, wherein the shared storage also supports booting the different information handling system to a different custom-configured instance of the operating system.

14. The information handling system of claim 13, wherein the delta driver comprises:

computer instructions in the RAM and executable by the one or more CPUs to provide the first virtual storage subdivision for the information handling system.

15. The information handling system of claim 13, wherein the delta driver comprises:

hardware, in communication with the one or more CPUs, operable to provide the first virtual storage subdivision for the information handling system.

16. A method of booting an information handling system to a custom-configured instance of an operating system from shared storage, the method comprising:

during a boot process for an information handling system, automatically consulting delta driver configuration data to identify which delta storage subdivision among multiple delta storage subdivisions in shared storage is associated with the information handling system, wherein the multiple delta storage subdivisions contain modified operating-system data configured for respective information handling systems;

using a delta driver in communication with the shared storage to provide a first virtual storage subdivision for the information handling system, based on a shared operating-system storage subdivision in the shared storage containing substantially unmodified operating-system data and the delta storage subdivision in the shared storage identified as associated with the information handling system; and booting an instance of the modified operating-system data configured for the information handling system into the information handling system from the virtual storage subdivision.

17. A method according to claim 16 for booting multiple information handling systems to respective, custom-configured instances of the operating system from shared storage, the method comprising:

booting a second instance of the modified operating-system data configured for a second information handling system into the second information handling system from a second virtual storage subdivision.

18. A method according to claim 16, further comprising:

loading an input/output (I/O) hardware driver into a random access memory (RAM) of the information handling system during execution of basic input/output system (BIOS) boot instructions in the information handling system;

loading the delta driver into the RAM of the information handling system after the I/O hardware driver has been loaded into the RAM; and after loading the delta driver into the RAM, using the delta driver to boot the instance of the modified operating-system data configured for the information handling system into the information handling system.

19. A method according to claim 18, wherein the operation of using the delta driver to boot the instance of the modified operating-system data comprises:

receiving a read command at the delta driver from the information handling system, wherein the read command includes a storage location;

in response to receiving the read command, automatically determining whether delta driver configuration data associates the storage location in the read command with the first delta storage subdivision;

if the delta driver configuration data associates the storage location in the read command with the first delta storage subdivision, using the I/O hardware driver to retrieve at least some of the modified operating-system data configured for the information handling system from the first delta storage subdivision of the shared storage;

if the delta driver configuration data does not associate the storage location in the read command with the first delta storage subdivision, using the I/O hardware driver to retrieve at least some of the substantially unmodified operating-system data from the shared operating-system storage subdivision of the shared storage; and responding to the read command with retrieved data.

20. A method according to claim 16, wherein:

the shared operating-system storage subdivision comprises a read-only version of code for the operating system; and the operation of using the delta driver to provide the first virtual storage subdivision comprises automatically accessing the read-only version of code for the operating system.

* * * * *